Feb. 11, 1941.   A. J. HAVLIS   2,231,334
CAGE
Filed Sept. 6, 1938   2 Sheets-Sheet 1
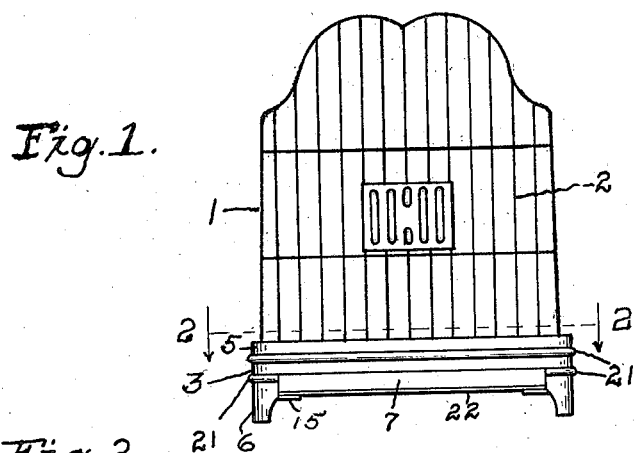
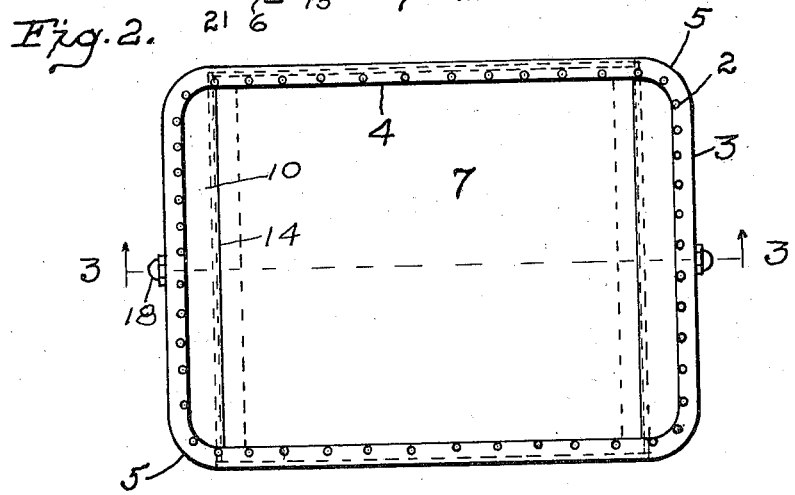
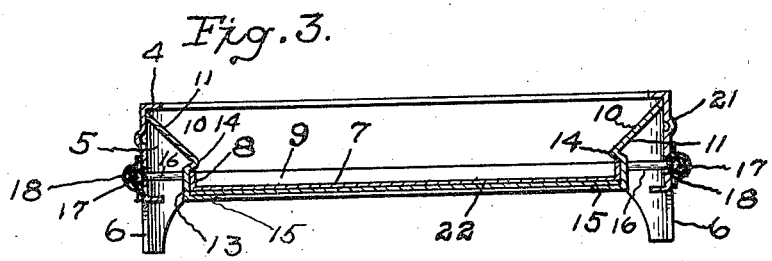
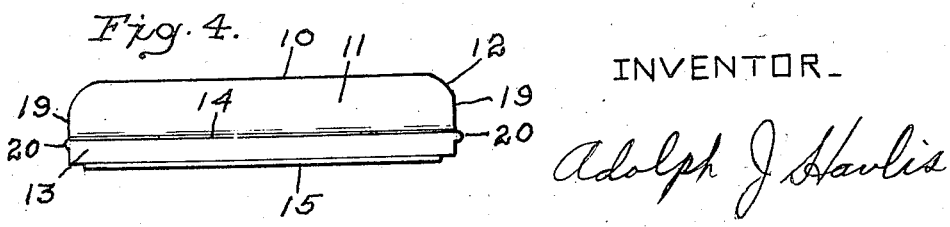
INVENTOR.
Adolph J Havlis Feb. 11, 1941.  A. J. HAVLIS  2,231,334
CAGE
Filed Sept. 6, 1938   2 Sheets-Sheet 2

INVENTOR.

Adolph J Havlis

Patented Feb. 11, 1941

2,231,334

UNITED STATES PATENT OFFICE 2,231,334

CAGE

Adolph J. Havlis, Chicago, Ill., assignor to Earl W. Little, Indianapolis, Ind.

Application September 6, 1938, Serial No. 228,549

2 Claims. (Cl. 119—17)

This invention relates to cages and particularly of that type for the reception of birds or the like and one feature of the invention is the provision of a substantially rectangular cage having rounded corners and with the body and base of the cage formed in a single unit and so arranged that a plurality of the cages may be nested together for shipping purposes.

A further feature of the invention is the provision of a tray adapted to be slidably mounted in the cage, a false bottom member also being slidably mounted within the cage at a point beneath the tray, when assembled, the cage with the corners of the tray and false bottom being right angular.

A further feature of the invention is in so constructing the tray that the width thereof will be less than the length of the cage body with the front and rear walls thereof resting beneath the conventional overhang of the cage and the side edges inwardly of the end overhangs.

A further feature of the invention is the provision of shields adapted to be removably secured to the base portion of the cage and in position to cause the droppings adjacent the sides of the tray to descend into the tray and prevent the same from descending into the spaces between the sides of the tray and ends of the cage base, the lower edges of the shields having means thereon for receiving and supporting the tray and false bottom when entered in the cage.

A further feature of the invention is the provision of means for removably attaching the shields to the base portion of the cage and for holding the shields in fixed position when entered within the cage structure.

Other objects and advantages of the invention will be apparent from the following detailed description taken in connection with the accompanying drawings, in which:

Figure 1 is an elevational view of a cage embodying the new features of the invention.

Figure 2 is a sectional view, on an enlarged scale, as seen from line 2—2, Fig. 1.

Figure 3 is a sectional view as seen along line 3—3, Fig. 2.

Figure 4 is a front elevational view of one of the shields removed from the cage.

Figure 5:
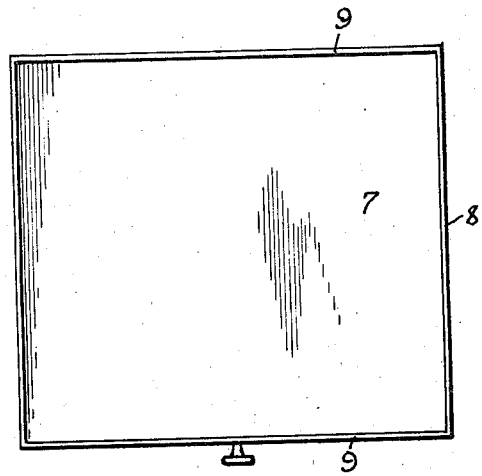
Figure 5 is a top plan view of the tray for the cage.
Figure 6:
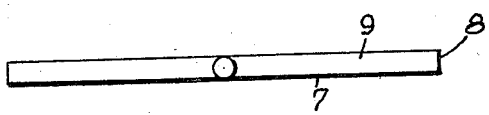
Figure 6 is a front elevation thereof.
Figure 7:
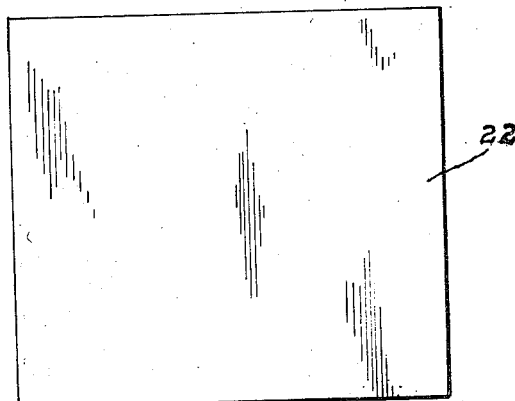
Figure 7 is a top plan view of the false bottom for the cage.
Figure 8:
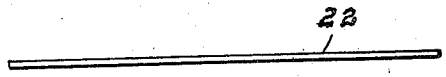
Figure 8 is an edge elevation thereof.

Referring to the drawings in which similar reference numerals designate corresponding parts throughout the several views, the numeral 1 designates the body portion of a cage, formed of the conventional wires 2, and 3 indicates the base portion of the cage, the body and base portions being substantially rectangular in general outline.

The base member 3 is in the nature of an endless band and is provided at its upper edge with a surrounding inwardly extending flange 4 and has its corner portions 5 rounded or curved to any appropriate degree and may extend in a straight line from its top to its bottom, but is preferably provided with supporting feet 6, which may be formed integral with the base portion or made separate therefrom and secured thereto in any suitable manner.

The cage is preferably provided with a tray 7, for catching any droppings or the like and in order to cheapen the construction of the tray, the width of the tray is made less than the length of the base member, said tray having side and end flanges 8 and 9 respectively directed at right angles to each other, the end flanges 9 resting beneath the overhang formed by the flange 4, while the side flanges 8 are positioned a distance inwardly from the line of the flange 4 at the ends of the base member 3.

As the width of the tray is less than the length of the base member, so as to be free of the curved corners of the base member, a space will be left between the sides of the tray and the ends of the base member and to prevent droppings from entering the spaces between the tray and end walls of the base member, shields 10 are provided, comprising wing sections 11 which extend from the side edges of the tray to a point beneath the flange 4 at the ends of the base member, the upper corners 12 thereof being curved to fit the curvature of the corner portions 5 while the straight upper edge of the wing engages the under face of the flange 4.

The lower edge of each shield 10 is formed into a channel 13, into which the tray 7 is adapted to slide and by means of which the tray is supported within the cage, the lower edge of each wing section 11 being provided with a bead 14, which slightly overhangs the side flange 8 of the tray, while the tray rests on the flange portion 15 of the channel.

The shields 10 are removably secured to the end walls of the base member 3 in any suitable manner, but preferably by means of studs 16, which are preferably carried by the shields and have heads 17 at their free ends adapted to enter any suitable form of snap socket 18 carried by the end walls of the base member.

The shields 10 are held in fixed position and in alignment to receive the tray 7 by positioning the top edges of the wing portions 11 in engagement with the under face of the flange 4, the upper corners 12 of the wings 11 fitting the rounded contour of the corner portions 5, the ends 19 of the wing portions 11 having tongues 20 formed thereon for engagement with the recess of one of the reinforcing beads 21 formed in the surface of the base member 3.

In order to provide a closure for the cage when the tray is removed, a false bottom 22 is provided, which is in the nature of a flat plate and is of the same dimensions as the tray 7 and normally rests beneath the tray when the tray and false bottom are mounted in the cage. By providing the shields 10, the material from which the tray and false bottom are made may be of standard width, regardless of the length of the cage structure, thereby resulting in a material saving in the amount of metal required for the construction of the tray and false bottom, regardless of the size of the cage.

I am aware that it is old to have trays and false bottoms of less area than the area of the base portion of the cage, but none of such structures shows shields for directing the droppings into the tray and having channels at their lower extremities forming supports for the tray and false bottom. Neither do former structures show the shields as removably secured to the cage structure so that said shields may be removed and a plurality of the cages nested together for storage or transportation purposes. In former cages of this nature, the reduction of the width of the tray is limited to the extent of the overhang portion of the cage, while in the present construction, the width of the cage is not limited to the overhang portion, as the shields may be made of a size to extend to the side sections of the tray, regardless of the width of the tray.

I am also aware that it is old to provide shields interiorly of the cage, but said shields are fixed to the cage and such cages can not be successfully nested for conserving storage space or nested together for shipping purposes.

What I claim is:

1. In a cage structure, the combination with a base member having snap sockets attached to the walls thereof, of a tray slidable into or out of said base member shields having channels for guiding and supporting said tray, means at the ends of said shields for engagement with the side walls of said base member for holding said shields in fixed horizontal position, studs carried by said shields, and heads on said studs adapted to frictionally engage with said snap sockets for removably attaching said shields to said base member.

2. In a cage construction, a substantially rectangular shaped cage body and base therefor, said base being integral with said cage body, and having outwardly pressed beads at its sides and ends, an overhang at the juncture of said body and base, a tray having sliding connection with said base and of less width than the length of said base and leaving a vacant space between the tray and ends of the base, shields for preventing droppings from entering the space between said tray and end walls of the base, means at the lower ends of said shields for guiding and supporting said tray, means at the ends of said shields for engagement with the concavity of one of said beads for holding said shields against tilting, and means for removably attaching said shields within said base.

ADOLPH J. HAVLIS.